United States Patent
Coudurier et al.

(10) Patent No.: US 8,930,416 B2
(45) Date of Patent: Jan. 6, 2015

(54) JOB DISPATCHER OF TRANSCODING JOBS FOR MEDIA PROGRAMS

(75) Inventors: Baptiste Coudurier, Los Angeles, CA (US); Xiuming Chen, Los Angeles, CA (US)

(73) Assignee: Hulu, LLC, Santa Monica, CA (US)

( * ) Notice: Subject to any disclaimer, the term of this patent is extended or adjusted under 35 U.S.C. 154(b) by 218 days.

(21) Appl. No.: 13/584,161

(22) Filed: Aug. 13, 2012

(65) Prior Publication Data

US 2014/0046974 A1 Feb. 13, 2014

(51) Int. Cl.
*G06F 7/00* (2006.01)

(52) U.S. Cl.
USPC .......................................................... 707/808

(58) Field of Classification Search
CPC .................................................... G06F 9/5083
USPC ........................... 707/688, 700, 809, 999.205
See application file for complete search history.

(56) References Cited

U.S. PATENT DOCUMENTS

| | | | | |
|---|---|---|---|---|
| 6,560,717 B1 * | 5/2003 | Scott et al. | ...................... | 714/4.1 |
| 7,716,061 B2 * | 5/2010 | Keohane et al. | ............... | 705/1.1 |
| 8,015,564 B1 * | 9/2011 | Beyer et al. | .................... | 718/100 |
| 8,108,877 B2 * | 1/2012 | Dillenberger et al. | ........ | 718/105 |
| 8,363,102 B1 * | 1/2013 | Kadoch et al. | ................ | 348/148 |
| 8,510,273 B2 * | 8/2013 | Richards et al. | .............. | 707/688 |
| 8,645,454 B2 * | 2/2014 | Mathew | ........................ | 709/201 |
| 8,661,136 B2 * | 2/2014 | Tumbde et al. | ............... | 709/226 |
| 2003/0126200 A1 * | 7/2003 | Wolff | ............................ | 709/203 |
| 2005/0038890 A1 * | 2/2005 | Masuda et al. | ................ | 709/224 |
| 2007/0143460 A1 * | 6/2007 | Ben-David et al. | ........... | 709/223 |
| 2008/0168463 A1 * | 7/2008 | Donohue et al. | ............. | 718/105 |
| 2008/0183876 A1 * | 7/2008 | Duvur et al. | .................. | 709/228 |
| 2008/0298240 A1 * | 12/2008 | Lee et al. | ...................... | 370/235 |
| 2009/0031312 A1 * | 1/2009 | Mausolf et al. | ............... | 718/102 |
| 2009/0119322 A1 * | 5/2009 | Mills et al. | .................... | 707/101 |
| 2009/0144422 A1 * | 6/2009 | Chatley et al. | ................ | 709/226 |
| 2010/0057828 A1 * | 3/2010 | Hofmann et al. | ............. | 709/202 |
| 2010/0281042 A1 * | 11/2010 | Windes et al. | ................ | 707/756 |
| 2011/0093860 A1 * | 4/2011 | Martikainen et al. | ......... | 718/104 |
| 2011/0212783 A1 * | 9/2011 | Dale et al. | ........................ | 463/42 |
| 2011/0225298 A1 * | 9/2011 | Brown et al. | .................. | 709/226 |
| 2012/0166514 A1 * | 6/2012 | Mathew | ........................ | 709/201 |
| 2012/0191876 A1 * | 7/2012 | Johnson et al. | ............... | 709/246 |
| 2012/0311099 A1 * | 12/2012 | Yoshida | ........................ | 709/219 |
| 2013/0031559 A1 * | 1/2013 | Alicherry | ...................... | 718/104 |
| 2013/0080517 A1 * | 3/2013 | T'Syen et al. | ................ | 709/203 |
| 2013/0304774 A1 * | 11/2013 | Tan et al. | ...................... | 707/827 |
| 2013/0318525 A1 * | 11/2013 | Palanisamy et al. | .............. | 718/1 |

* cited by examiner

*Primary Examiner* — Mohammed R Uddin
(74) *Attorney, Agent, or Firm* — Brian N. Young; Fountainhead Law Group PC

(57) ABSTRACT

In one embodiment, a method determines a job to dispatch for transcoding a source file. The source file is stored on a node in a distributed file system in which a plurality of nodes are storing a plurality of source files. The method then determines location information for the source file in the distributed file system where the location information identifies the node in which the source file is stored. Also, a node in the plurality of nodes is determined in which to dispatch the source file based on the location information for the source file. Then, the job is dispatched to the determined node such that transcoding of the source file is performed on the determined node.

21 Claims, 5 Drawing Sheets

JOB DISPATCHER OF TRANSCODING JOBS FOR MEDIA PROGRAMS

BACKGROUND

A service, such as a video content distributor website, allows users to view videos. Content providers provide video files to the content distributor. The files are referred to as "master" or "mezzanine" files, which are large files that are in a high quality, such as full high definition (HD) or the highest bitrate. These files need to be transcoded into different formats. For example, the files need to be transcoded into different bitrates or information needs to be added to the files, such as captions need to be burned into the video.

The video files are typically stored on nodes that are specialized for storing files. To transcode one of the video files, the content of the video file is transferred to another node that specializes in processing video files. For example, nodes that store the video files may have limited processing power that is insufficient for efficiently transcoding video files. The nodes that process the video files have more processing power and can efficiently transcode multiple video files. After finishing the transcoding, the node outputs the transcoded video file for storage on another node, which may be another node that stores transcoded video files. This provides a duty of separation between storage and processing. However, the file must be transferred from a first node that is storing the video file to a second node to transcode the video file, and then from the second node to a third node to store the transcoded video file, which uses network bandwidth.

SUMMARY

In one embodiment, a method determines a job to dispatch for transcoding a source file. The source file is stored on a node in a distributed file system in which a plurality of nodes are storing a plurality of source files. The method then determines location information for the source file in the distributed file system where the location information identifies the node in which the source file is stored. Also, a node in the plurality of nodes is determined in which to dispatch the source file based on the location information for the source file. Then, the job is dispatched to the determined node such that transcoding of the source file is performed on the determined node.

In one embodiment, a method is provided comprising: determining a job to dispatch for transcoding a source file, wherein the source file is stored on a node in a distributed file system in which a plurality of nodes are storing a plurality of source files; determining location information for the source file in the distributed file system, the location information identifying the node in which the source file is stored; determining, by a computing device, status information regarding current processing of jobs for the plurality of nodes; applying, by the computing device, the location information and the status information to a set of rules to determine a node in which to transcode the source file, wherein a first rule regarding the location information of where the source file is stored; and dispatching, by the computing device, the job to the determined node to have transcoding of the source file performed on the node.

In one embodiment, a non-transitory computer-readable storage medium is provided containing instructions, that when executed, control a computer system to be configured for: determining a job to dispatch for transcoding a source file, wherein the source file is stored on a node in a distributed file system in which a plurality of nodes are storing a plurality of source files; determining location information for the source file in the distributed file system, the location information identifying the node in which the source file is stored; determining a node in the plurality of nodes in which to dispatch the source file based on the location information for the source file; and dispatching the job to the determined node such that transcoding of the source file is performed on the determined node.

In one embodiment, a non-transitory computer-readable storage medium is provided containing instructions, that when executed, control a computer system to be configured for: determining a job to dispatch for transcoding a source file, wherein the source file is stored on a node in a distributed file system in which a plurality of nodes are storing a plurality of source files; determining location information for the source file in the distributed file system, the location information identifying the node in which the source file is stored; determining, by a computing device, status information regarding current processing of jobs for the plurality of nodes; applying, by the computing device, the location information and the status information to a set of rules to determine a node in which to transcode the source file, wherein a first rule regarding the location information of where the source file is stored; and dispatching, by the computing device, the job to the determined node to have transcoding of the source file performed on the node.

The following detailed description and accompanying drawings provide a better understanding of the nature and advantages of particular embodiments.

DETAILED DESCRIPTION

Described herein are techniques for a system to dispatching jobs for transcoding video files. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
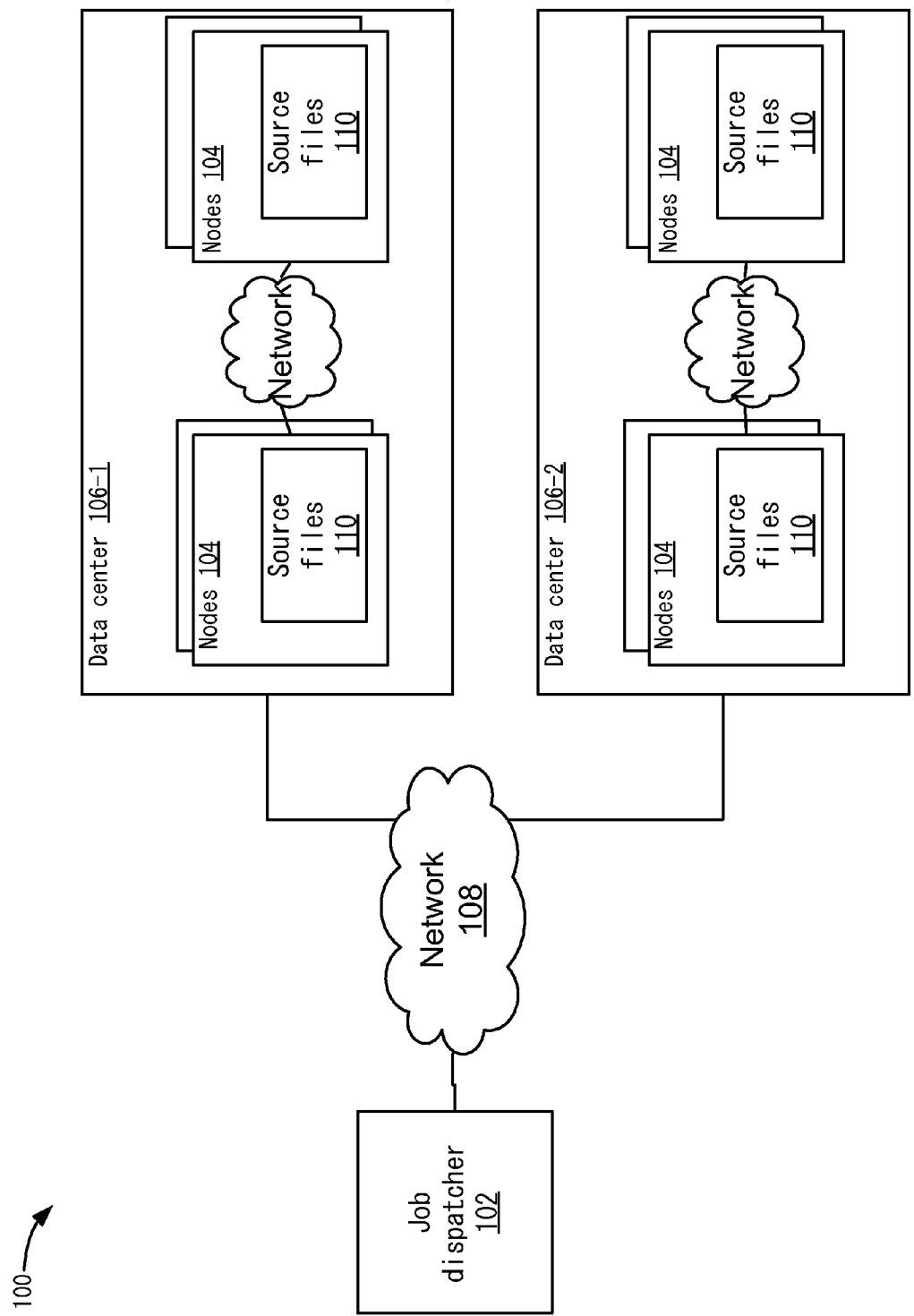
FIG. 1 depicts a simplified system for transcoding video files according to one embodiment.

FIG. 1 depicts a simplified system 100 for transcoding video files according to one embodiment. System 100 includes a job dispatcher 102 and a plurality of nodes 104. In one embodiment, nodes 104 may be included in different data centers 106-1-106-2. However, it will be understood that nodes 104 may be included in only one data center 106 or more than two data centers 106. Additionally, job dispatcher 102 is shown as being separate from data centers 106, but it will be understood that job dispatcher 102 may be included in a data center 106, in a subset of data centers 106, or in all data centers 106.

In one embodiment, job dispatcher 102 communicates with data centers 106 through a network 108, which may be a wide area network (WAN), to dispatch jobs to transcode video files to nodes 104. If job dispatcher 102 is included in a data center 106, network 108 may be a local area network (LAN). Job dispatcher 102 determines a node 104 that should transcode a source file 110 and dispatches a job to perform the transcoding to that node 104. In one embodiment, as will be described in more detail below, job dispatcher 102 attempts to dispatch the job to a node 104 that is already storing source file 110. Thus, source file 110 does not need to be transferred on a network that couples different nodes 114 together in a data center 106 or through network 108 that couples data centers 106 together.

In one example, a content provider sends videos to a content distributor. The videos are stored in source files 110, which are then stored on nodes 104. Source files 110 for a single video may not be stored on every node 104. For example, a source file 110 may be sent to data center 106-2 and stored on two or three nodes 104 in that data center. Thus, not all nodes 104 in data center 106-2 are storing source file 110 and no nodes 104 in data center 106-1 are storing source file 110. Other variations may also exist where source file 110 is stored on different variations of nodes 104 in data centers 106.

Nodes 104 may be nodes that store source files 110 and also process (e.g., transcode) source files 110. Also, some nodes 104 may only store source files 110 and some nodes may only process source files 110. Nodes 104 may be computing devices that can store source files 110. Multiple nodes 104 may be included in a storage rack. The storage rack may be a physical enclosure in which multiple nodes 104 are installed. Nodes 104 within a rack are networked together. Additionally, multiple racks are networked together. As will be discussed below, transferring data between nodes 104 in a rack may be faster than transferring data between nodes 104 in different racks.

The computing devices may include hard disk drives, optical drives, and solid state storage drives to store source files 110 and also computer processing units (CPUs) with sufficient power to perform multiple transcoding jobs above certain specifications. Conventionally, nodes that stored source files 110 may have not included large amounts of CPU processing power because the nodes only used the CPU to write data. The CPU processing power was not conventionally high enough to transcode a source file within an acceptable period of time. However, nodes that store source files 110 now include higher CPU processing power. Nodes 104 can store source files 110 and also use the increased processing power to perform transcoding of source files 110.

To leverage the increased processing power and to more efficiently perform transcoding, particular embodiments attempt to determine a location where source files 110 are being stored and dispatches jobs based on the location. For example, particular embodiments may send jobs to those nodes 104 that are storing the source files 110. Then, the transcoding is performed by a node 104 that is storing source file 110, which reduces the network bandwidth used because a source file 110 does not need to be transferred to another node 104 to have the transcoding performed. If the job cannot be dispatched to a node 104 that is storing source file 110, then particular embodiments may take the location into account to assign the job to a node 104 that is within a same rack as a node 104 storing source file 110. This also saves network bandwidth because transferring source file 110 within a rack may be faster than transferring source files between racks.

Additionally, job dispatcher 102 may also use other factors to determine where to dispatch a job, which will be described in more detail below.

Figure 2:
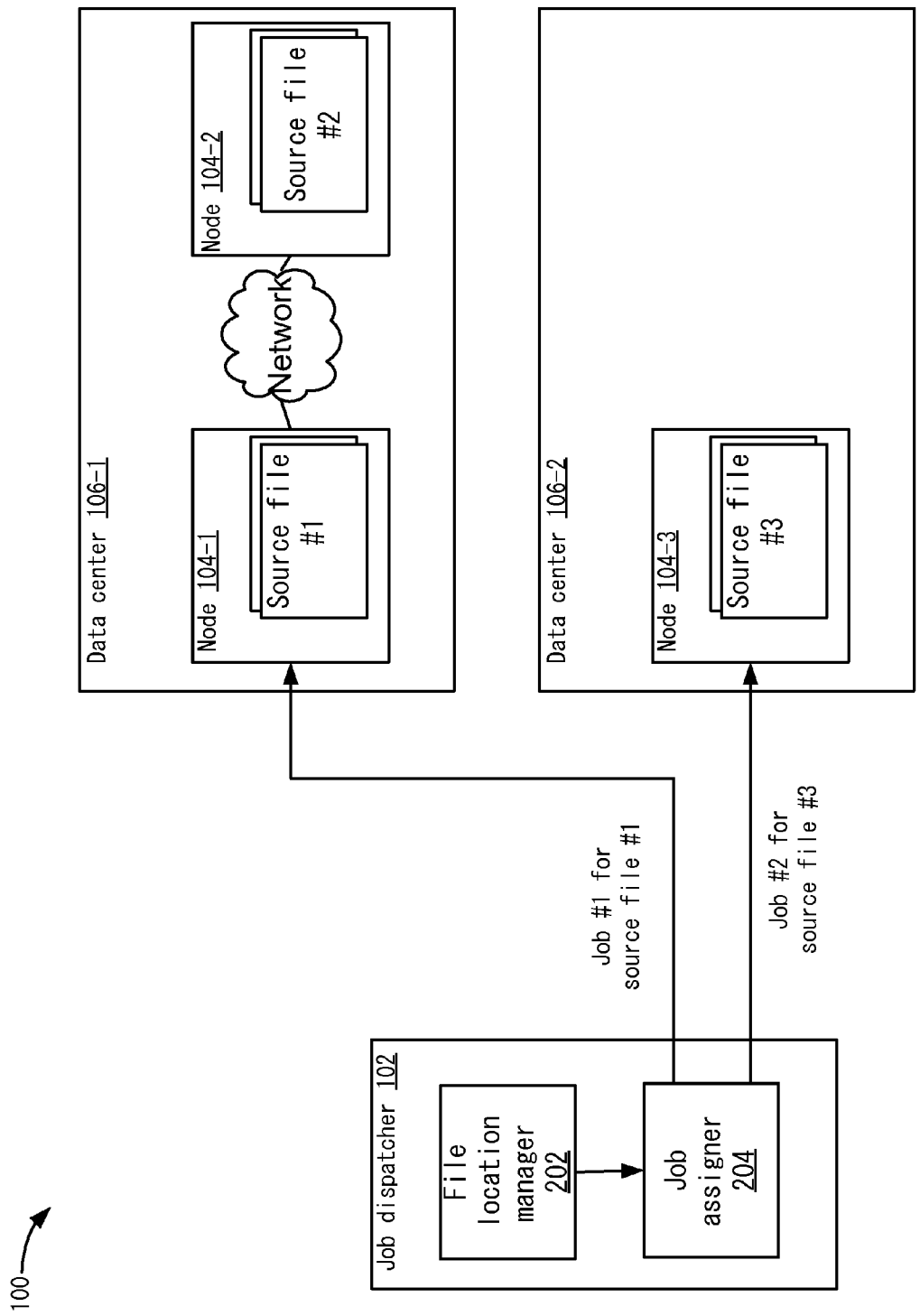
FIG. 2 depicts a more detailed example of the system according to one embodiment.

FIG. 2 depicts a more detailed example of system 100 according to one embodiment. A first node 104-1 is shown storing a source file #1, a second node 104-2 stores a source file #2, a third node 104-3 is storing a source file #3. Node 104-2 is not storing source file #1 and node 104-1 is not storing source file #2. Thus, for node 104-2 to transcode source file #1, source file #1 would have to be transferred to node 104-2 through a LAN. Also, for node 104-3 to perform the transcoding, source file #1 would have to be transferred through the WAN.

Job dispatcher 102 includes a file location manager 202 that can determine where source files 110 are being stored. In one example, source files 110 are stored in a distributed file system. The distributed file system stores sources files on different physical nodes 104. However, a logical view for a device that is accessing the distributed file system makes it appear that the device is accessing a single file system on a single device. To determine where a source file 110 is being stored, file location manager 202 may send a query to the distributed file system. For example, file location manager 202 may send a query to a storage management server. The storage management server may then look up where source file 110 is being stored in the distributed file system. File location manager 202 then receives the location (e.g., a node 104) where the source file 110 is being stored.

If jobs for source files #1 and #3 need to be assigned, a job assigner 204 determines where to assign jobs for transcoding source files #1 and #3. For example, job assigner 204 uses an algorithm that weighs different factors to determine where to assign a job. In this example, the location of source files #1 or #3 is used to assign the job; however, job assigner 204 may take other factors into account, as will be discussed in more detail below.

If only location is taken into account, job assigner 204 assigns a job #1 to node 104-1 to transcode source file #1 and assigns a job #2 for source file #3 to node 104-3. Because node 104-1 is storing source file #1, no network bandwidth is used to transfer source file #1. The same is true for transcoding source file #3 because node 104-3 is storing source file #3. Accordingly, the increased CPU processing power for nodes 104 is leveraged by dispatching jobs to where source files 110 are being stored, which minimizes network bandwidth used. That is, source files #1 and #3 are not transferred to another node 104 to have the job performed.

Figure 3:
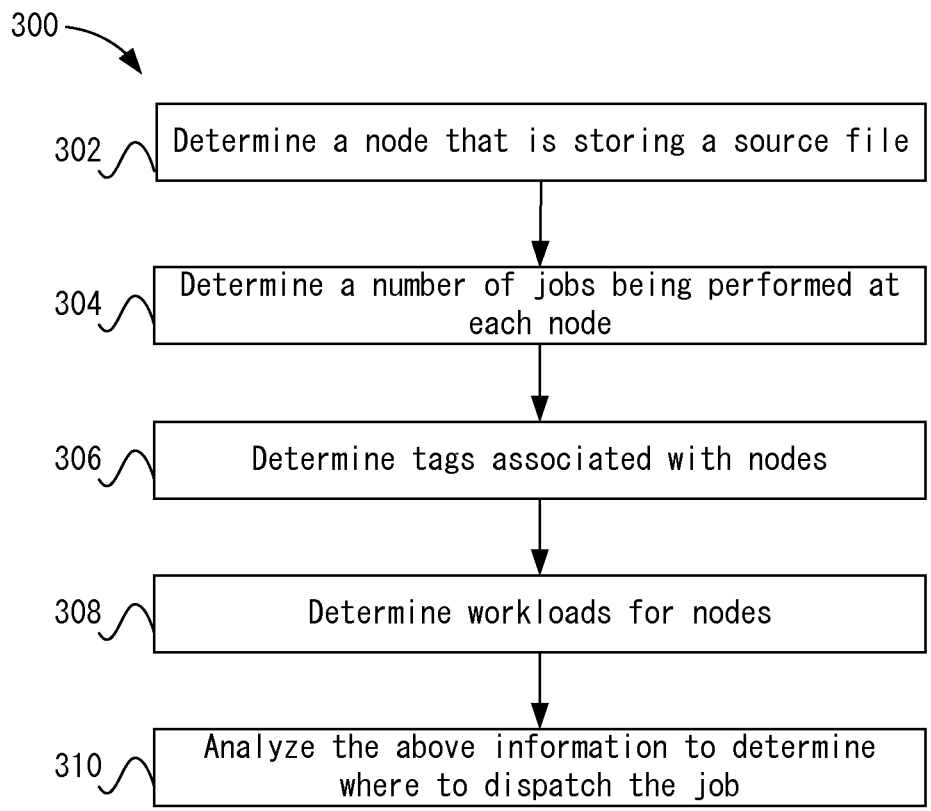
FIG. 3 depicts a simplified flowchart of a method for dispatching jobs according to one embodiment.

As discussed above, different factors may be used to determine where to dispatch a job. In one embodiment, job assigner 204 uses a rating system to weight different criteria. For example, job assigner 204 rates nodes 104 and selects the highest rated node 104 for dispatching a job. FIG. 3 depicts a simplified flowchart of a method for dispatching jobs according to one embodiment. Job assigner 204 may use all of the following criteria or only a subset. At 302, job assigner 204 determines a node 104 that is storing a source file 110. As described above, file location manager 202 queries the distributed file system to determine the location. In one example, job assigner 204 weights the node 104 that is storing source file 110 with a weight of "2", nodes 104 in a same rack as node 104 with a weight of "1", and nodes 104 not in the same rack with a weight of "0".

At 304, job assigner 204 determines a number of jobs being performed at each node 104. In one example, the number of jobs performed by each node 104 is limited. This preserves the processing power for each node 104 and makes sure that the jobs can be performed in a timely manner. For example, if the number of jobs a node 104 is performing increases past a limit, transcodes of other jobs being performed may be slowed. In one example, if a node 104 is currently executing a number of jobs below a threshold, a weight of 1 is assigned, and if the node 104 is currently executing a number of jobs above a threshold, a weight of 0 is assigned. Thus, in one example, if a node is executing over 5 jobs, the node gets a weight of 0 because it may not be desirable to assign more jobs to the node.

At 306, job assigner 204 determines tags associated with nodes. For example, different tags may be associated with different characteristics. In one example, different nodes 104 may perform different services, such as nodes may be associated with inserting different ads into videos. If an ad is to be included in source file 110, then a node 104 that is tagged as being able to insert that ad into source file 110 may be selected. In one example, job assigner 204 assigns the job to a node 104 if a tag is applicable. For example, job assigner 204 assigns a weight that ensures the job is assigned to that node 104. In another example, job assigner 204 assigns a weight of 2 for a node 104 that has an applicable tag and a weight of 0 for nodes 104 without applicable tags.

At 308, job assigner 204 determines workloads for nodes 104. For example, the workload may be the amount of open capacity each node has or the amount of processing power being used at node 104. In one example, if a node 104 currently has a capacity below a threshold, a weight of 1 is assigned, and if the node 104 currently has a capacity above a threshold, a weight of 0 is assigned. Thus, in one example, if a node has more open capacity, the node gets a weight of 1 because it is desirable to assign more jobs to the node due to extra processing power.

At 310, job assigner 204 analyzes the above information to determine where to dispatch the job. For example, each of the above factors is input into an algorithm and a node 104 is selected. In one example, job assigner 204 adds the weights for all criteria for each node 104 and selects a node 104 with the highest weight.

In one example, it may be preferred that the job is dispatched to the node 104 that is storing source file 110. However, that node 104 may already be processing a large number of jobs and may not have CPU processing power available to transcode source file 110 without slowing other jobs. For example, a threshold is defined for a time to transcode source file 110. Adding additional jobs to node 104 may cause the transcoding time for other jobs to go down. Thus, job assigner 204 may determine if adding the job will cause the time to transcode source file 110 (and other jobs) to go below the threshold. If so, job assigner 204 may want to assign the job to another node 104. In one embodiment, job assigner 204 attempts to assign the job to another node 104 that is in the same storage rack. This may decrease the amount of network bandwidth used because transferring source file 110 within a storage rack uses less network bandwidth than transferring source file 110 to another storage rack.

Figure 4A:
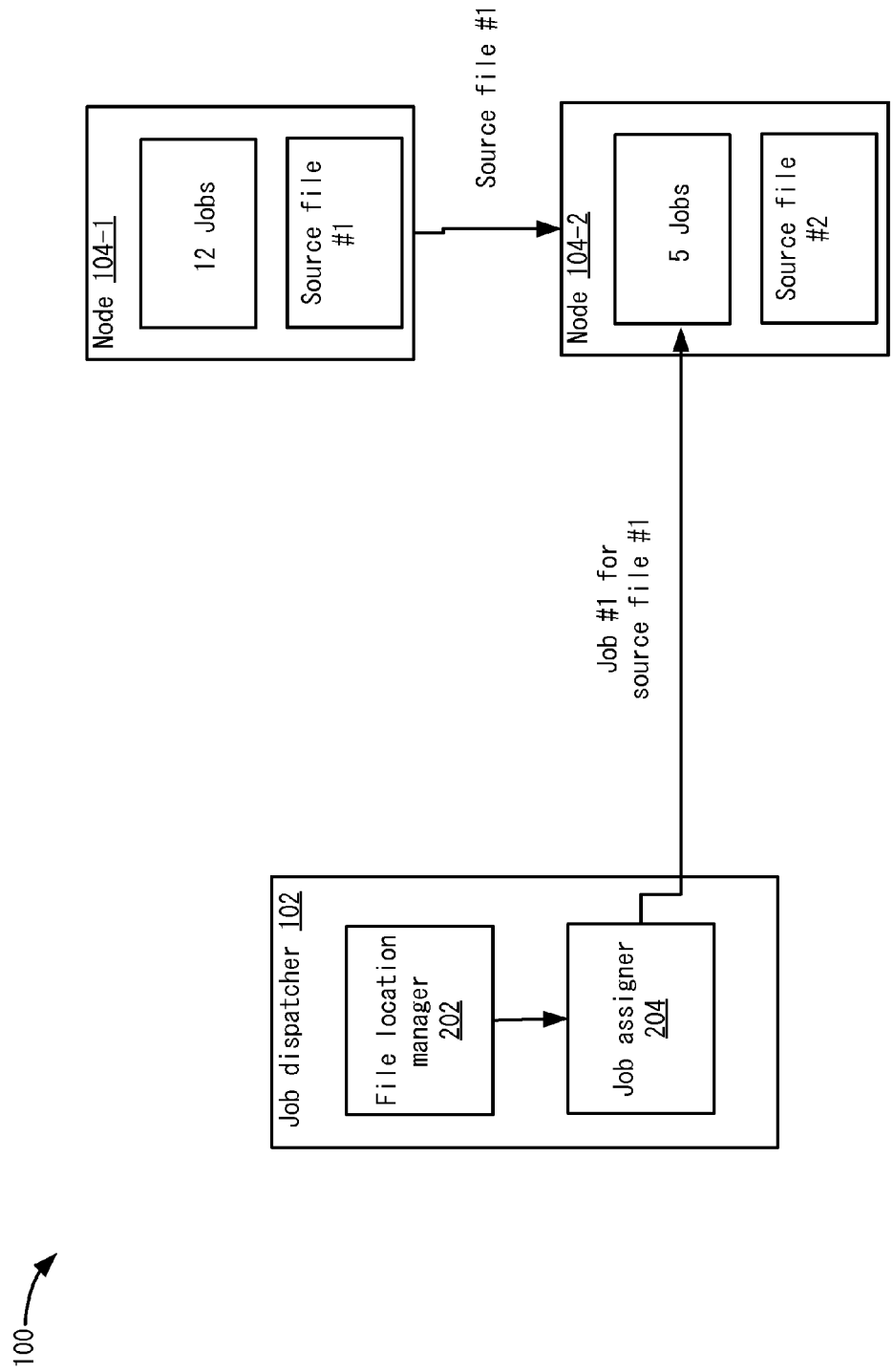
FIG. 4A depicts an example where a number of jobs are limited on a node according to one embodiment.

FIG. 4A depicts an example where a number of jobs are limited on a node 104 according to one embodiment. Job dispatcher 102 wants to dispatch a job for transcoding a source file #1 where node 104-1 is storing source file #1. However, node 104-1 is currently running 12 jobs. In one example, node 104-1 may have a 1 gigabit interface, and thus can output 1 gigabit per second. If files can be transcoded at 80 megabits per second, the 12 jobs would be using 960 megabits per second. The maximum is 1 gigabit per second or 1000 megabits per second. If 12 jobs are executing, then 960 megabits per second are being output. Thus, node 104-1 is at its maximum capacity if transcoding jobs at 80 megabits per second are to be maintained.

Adding a job to node 104-1 would slow the other transcodings being performed by other jobs on node 104-1. In one example, even though node 104-1 is storing source file #1, job dispatcher 102 may dispatch the job to node 104-2, which may not be storing source file #1. Node 104-1 (or another node) may then have to transfer source file #1 via a network to node 104-2. The transfer uses network bandwidth; however, node 104-2 is only executing 5 jobs. Thus, node 104-2 has excess processing power available and can add jobs without slowing down other jobs. Accordingly, node 104-2 may be able to execute the job faster than node 104-1. Also, the cost of transferring source file #1 may be less than the cost of slowing the other 12 jobs being performed on node 104-1.

Additionally, job dispatcher 102 may check the number of jobs that are being executed for source file #1. For example, if source file #1 already has 10 jobs being executed, then job dispatcher 102 may limit the number of jobs for source file #1. This may prevent excess bandwidth being used to transfer source file #1 to multiple other nodes 104. For example, if 20 jobs need to be executed for source file #1 and node 104 only has capacity to execute 12 jobs, then, if 8 other jobs are transferred to multiple other nodes 104, source file #1 would need to be transferred to all of those other nodes. This may use a lot of network bandwidth. Thus, job dispatcher 102 may not dispatch more jobs for source file #1 if the number of jobs for source file #1 is over a threshold.

Figure 4B:
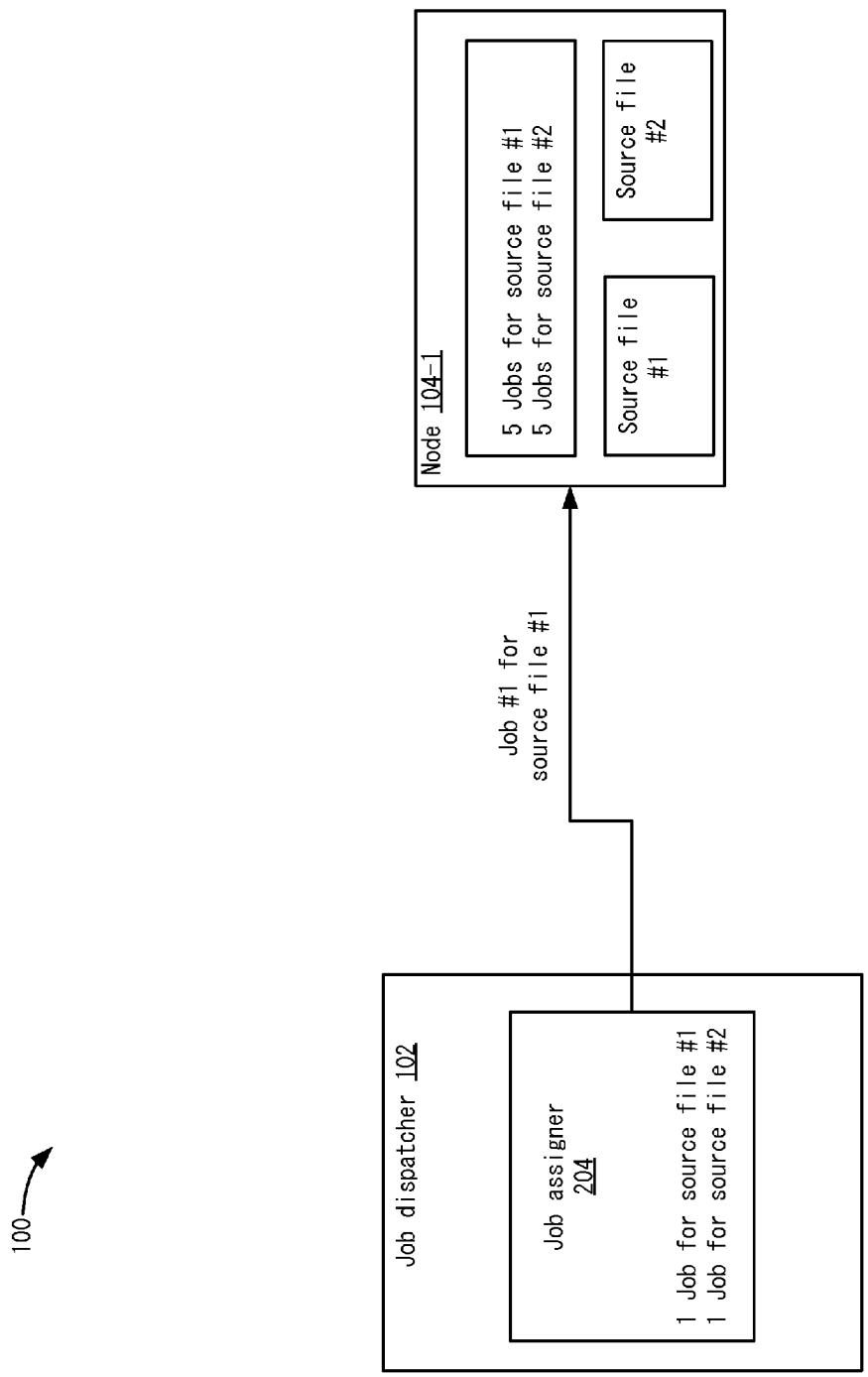
FIG. 4B depicts another scenario where a job may preempt another job according to one embodiment.

FIG. 4B depicts another scenario where a job may pre-empt another job according to one embodiment. Job dispatcher 102 needs to dispatch jobs for source file #1 and #2. Node 104-1 is storing source file #1 and is executing 5 jobs for source file #2 and 5 jobs for source file #1. Job dispatcher 102 determines that source file #1 is associated with a level 1 priority and source file #2 is associated with a level 2 priority. The level 1 priority is a higher priority than level 2. Job dispatcher 102 may have 2 jobs to dispatch for source file #1 and source file #2. In this case, job dispatcher 102 may decide that job #1 is dispatched to node 104-1 before job #2 is dispatched for source file #2.

Also, job assigner 204 may also take into account past decisions that were made. For example, if job assigner 204 assigned a job for source file 110 to a specific node 104 and that node 104 did not transcode the source file 110 in an acceptable time, then job assigner 204 may not assign the job to that node 104 again.

Accordingly, particular embodiments attempt to assign jobs to nodes 104 that are storing source files 110. Thus, CPU processing power of nodes is used. This efficiently uses computing power in a data center 106 while minimizing bandwidth used.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computing device, a job to dispatch for transcoding a source file, wherein the source file is stored on a node in a distributed file system in which a plurality of nodes are storing a plurality of source files;
    determining, by the computing device, location information for the source file in the distributed file system, the location information identifying the node in which the source file is stored;
    determining, by the computing device, status information regarding current processing of jobs for the plurality of nodes;
    applying, by the computing device, the location information and the status information to a set of rules to determine a node in which to transcode the source file, wherein the set of rules comprise:
        a first rule regarding the location information of where the source file is stored where the first rule weights a node based on whether the node is storing the source file,
        a second rule regarding a number of jobs currently being run on a node where the second rule weights the node based on the number of jobs,
        a third rule regarding a tagging rule where tags are associated with nodes in the plurality of nodes and the third rule weights a node based on if the node includes a tag applicable to the source file,
        a fourth rule regarding a computing workload associated with nodes in the plurality of nodes and the fourth rule weights a node based on the computing workload of the node; and
    using the weights for the plurality of nodes based on the first, second, third, and fourth rules to determine the node with a highest weight to dispatch the job; and
    dispatching, by the computing device, the job to the determined node to have transcoding of the source file performed on the node.

2. The method of claim 1, wherein the first rule includes a first weight if the node is storing the source file, a second weight if the node is in a same storage rack as the node that is storing the source file, and a third weight if the node is not in the same storage rack.

3. The method of claim 2, wherein:
    the second rule weights the node with a fourth weight if the node is running the number of jobs above a threshold and a fifth weight if the node is running the number of jobs below a threshold.

4. The method of claim 3, wherein:
    the third rule weights the node with a sixth weight if the node includes the tag applicable to the source file and a seventh weight if the node does not include the tag applicable to the source file.

5. The method of claim 4, wherein:
    the fourth rule weights the node with an eighth weight if the node has the computing workload above a threshold and a ninth weight if the node has a computing workload below a threshold.

6. The method of claim 1, wherein determining the location information comprises querying the distributed file system for the location information for the source file.

7. The method of claim 1, wherein the set of rules comprise:
    a fifth rule regarding a priority for a time limit for finishing transcoding of the source file, and
    the job preempts other jobs on the node in which the source file is stored when the priority for the source file is higher than a threshold when the fifth rule is applicable.

8. A non-transitory computer-readable storage medium containing instructions, that when executed, control a computer system to be configured for:
    determining a job to dispatch for transcoding a source file, wherein the source file is stored on a node in a distributed file system in which a plurality of nodes are storing a plurality of source files;
    determining location information for the source file in the distributed file system, the location information identifying the node in which the source file is stored;
    determining status information regarding current processing of jobs for the plurality of nodes;
    applying the location information and the status information to a set of rules to determine a node in which to transcode the source file, wherein the set of rules comprise:
        a first rule regarding the location information of where the source file is stored where the first rule weights a node based on whether the node is storing the source file,
        a second rule regarding a number of jobs currently being run on the node where the second rule weights a node based on the number of jobs,
        a third rule regarding a tagging rule where tags are associated with nodes in the plurality of nodes and the third rule weights a node based on if the node includes a tag applicable to the source file,
        a fourth rule regarding a computing workload associated with nodes in the plurality of nodes and the fourth rule weights a node based on the computing workload of the node; and
    using the weights for the plurality of nodes based on the first, second, third, and fourth rules to determine the node with a highest weight to dispatch the job; and
    dispatching the job to the determined node to have transcoding of the source file performed on the node.

9. The non-transitory computer-readable storage medium of claim 8, wherein the first rule includes a first weight if the node is storing the source file, a second weight if the node is in a same storage rack as the node that is storing the source file, and a third weight if the node is not in the same storage rack.

10. The non-transitory computer-readable storage medium of claim 9, wherein:
    the second rule weights the node with a fourth weight if the node is running the number of jobs above a threshold and a fifth weight if the node is running the number of jobs below a threshold.

11. The non-transitory computer-readable storage medium of claim 10, wherein:
    the third rule weights the node with a sixth weight if the node includes the tag applicable to the source file and a seventh weight if the node does not include the tag applicable to the source file.

12. The non-transitory computer-readable storage medium of claim 11, wherein:
the fourth rule weights the node with an eighth weight if the node has the computing workload above a threshold and a ninth weight if the node has a computing workload below a threshold.

13. The non-transitory computer-readable storage medium of claim 8, wherein the set of rules comprise:
a fifth rule regarding a priority for a time limit for finishing transcoding of the source file, and
the job preempts other jobs on the node in which the source file is stored when the priority for the source file is higher than a threshold when the fifth rule is applicable.

14. The transitory computer-readable storage medium of claim 8, wherein determining the location information comprises querying the distributed file system for the location information for the source file.

15. An apparatus comprising:
one or more computer processors; and
a non-transitory computer-readable storage medium comprising instructions, that when executed, control the one or more computer processors to be configured for:
determining a job to dispatch for transcoding a source file, wherein the source file is stored on a node in a distributed file system in which a plurality of nodes are storing a plurality of source files;
determining location information for the source file in the distributed file system, the location information identifying the node in which the source file is stored;
determining status information regarding current processing of jobs for the plurality of nodes;
applying the location information and the status information to a set of rules to determine a node in which to transcode the source file, wherein the set of rules comprise:
a first rule regarding the location information of where the source file is stored where the first rule weights a node based on whether the node is storing the source file,
a second rule regarding a number of jobs currently being run on the node where the second rule weights a node based on the number of jobs,
a third rule regarding a tagging rule where tags are associated with nodes in the plurality of nodes and the third rule weights a node based on if the node includes a tag applicable to the source file,
a fourth rule regarding a computing workload associated with nodes in the plurality of nodes and the fourth rule weights a node based on the computing workload of the node; and
using the weights for the plurality of nodes based on the first, second, third, and fourth rules to determine the node with a highest weight to dispatch the job; and
dispatching the job to the determined node to have transcoding of the source file performed on the node.

16. The apparatus of claim 15, wherein the first rule includes a first weight if the node is storing the source file, a second weight if the node is in a same storage rack as the node that is storing the source file, and a third weight if the node is not in the same storage rack.

17. The apparatus of claim 16, wherein:
the second rule weights the node with a fourth weight if the node is running the number of jobs above a threshold and a fifth weight if the node is running the number of jobs below a threshold.

18. The apparatus of claim 17, wherein:
the third rule weights the node with a sixth weight if the node includes the tag applicable to the source file and a seventh weight if the node does not include the tag applicable to the source file.

19. The apparatus of claim 18, wherein:
the fourth rule weights the node with an eighth weight if the node has the computing workload above a threshold and a ninth weight if the node has a computing workload below a threshold.

20. The apparatus of claim 15, wherein the set of rules comprise:
a fifth rule regarding a priority for a time limit for finishing transcoding of the source file, and
the job preempts other jobs on the node in which the source file is stored when the priority for the source file is higher than a threshold when the fifth rule is applicable.

21. The apparatus of claim 15, wherein determining the location information comprises querying the distributed file system for the location information for the source file.

* * * * *